United States Patent [19]
Ho et al.

[11] Patent Number: 6,055,219
[45] Date of Patent: Apr. 25, 2000

[54] METHOD OF SWITCHING THE MOTOR OPERATION OF AN OPTICAL DISC DRIVE BETWEEN THE CONSTANT LINEAR VELOCITY MODE AND THE CONSTANT ANGULAR VELOCITY MODE

[75] Inventors: Chi-Kwong Ho, Hsinchu; Chao-Long Tsai, Changhua Hsien, both of Taiwan

[73] Assignee: Mediatek, Inc., Taiwan

[21] Appl. No.: 09/071,073

[22] Filed: Apr. 30, 1998

[30] Foreign Application Priority Data

Feb. 27, 1998 [TW] Taiwan ................................ 87102843

[51] Int. Cl.⁷ ..................................................... G11B 7/00
[52] U.S. Cl. .................. 369/54; 369/50; 369/32
[58] Field of Search ................. 369/50, 32, 58, 369/124, 54

[56] References Cited

U.S. PATENT DOCUMENTS

| | | | |
|---|---|---|---|
| 5,153,869 | 10/1992 | Yoshimaru et al. | 369/50 |
| 5,182,741 | 1/1993 | Maeda et al. | 369/50 |
| 5,751,676 | 5/1998 | Kusano et al. | 369/50 |

*Primary Examiner*—Nabil Hindi
*Attorney, Agent, or Firm*—Blakely Sokoloff Taylor & Zafman

[57] ABSTRACT

A method is provided for use on an optical disc drive, which can automatically detect the current radial position of the pickup head to thereby switch the motor operation between the CLV (constant linear velocity) mode and the CAV (constant angular velocity) mode for optimal performance of the optical disc drive. The current radial position of the pickup head is detected by using CLV and CAV position estimating means. If the current radial position of the pickup head is at a preset switching point, the mode of operation is switched from the current one to the other. Moreover, the reference signals used in the respective modes are adaptively varied so as to allow the data transfer rate of the data read operation on the optical disc to be consistent in both modes without interrupting the reading and transferring of the data from the optical disc. The method can thus allow the benefits of a high data transfer rate, short seek time, and low power consumption by the optical disc drive.

12 Claims, 7 Drawing Sheets

METHOD OF SWITCHING THE MOTOR OPERATION OF AN OPTICAL DISC DRIVE BETWEEN THE CONSTANT LINEAR VELOCITY MODE AND THE CONSTANT ANGULAR VELOCITY MODE

BACKGROUND OF THE INVENTION

1. Field of the Invention

This invention relates to optical disc drives, and more particularly, to a method of automatically detecting the current position of the pickup head of the optical disc drive to thereby switch the motor operation of the optical disc drive between the CLV (constant linear velocity) mode and the CAV (constant angular velocity) mode without interrupting the reading and transferring of data from the optical disc.

2. Description of Related Art

The optical disc is a mass storage medium that can hold up to several megabits or even gigabits of binary data in a single piece of plastic disc, which is several times larger than the capacity of a conventional magnetic disk. Due to its high capacity, the optical disc is now widely used in the computer arena as the major data storage medium.

The optical disc is typically formed with a spiral-shaped track on which data are stored, in a radially outward manner from the innermost radial position to the outermost radial position. Therefore, the amount of data stored at a particular radial position is proportional to the distance between that position and the center of the optical disc. During read operation, the optical disc is rotated by a spindle motor, which can be controlled in either of the following two modes: constant linear velocity (CLV) mode and constant angular velocity (CAV) mode.

When the spindle motor is operating in the CLV mode, the speed of the spindle motor decreases linearly as the pickup head is moved farther from the center of the optical disc, as illustrated in FIG. 1A, if maintenance of a fixed data transfer rate is desired, as illustrated in FIG. 1B. It can be seen that if a higher data transfer rate is desired, a higher speed spindle motor should be utilized, which can cause the implementation cost to be high. Moreover, when the spindle motor is operating in the CLV mode, the spindle motor is subjected to frequent changes in speeds, which can cause the spindle motor to consume more electrical power and also cause an increase in the access time. These drawbacks are particularly serious if the optical disc drive is doubled in speed.

On the other hand, when the spindle motor is operating in the CAV mode, the data transfer rate increases linearly as the pickup head is moved farther from the center of the optical disc, as illustrated in FIG. 2A, if the speed of the spindle motor is maintained at a fixed value as illustrated in FIG. 2B. The CAV mode of operation is a solution to the above-mentioned problems of the CLV mode of operation, in that it allows the spindle motor to always rotate at a fixed speed irrespective of the current radial position of the pickup head. Therefore, the CAV mode of operation has the benefits of allowing a consistent seek time that is not varied due to any changes in the speed of the spindle motor, and also of reducing power consumption to below that of the CLV mode. It is to be noted that the CAV mode of operation herein is different from the CAV mode of operation for the spindle motor in hard disk drive, since the optical disc uses a spiral-shape track for data storage while the hard disk uses a number of concentric tracks for data storage.

It is a drawback of the CAV mode of the optical disc drive that the data density varies with the radial position of the pickup head. When the pickup head is located at the outermost radial position, it causes the highest data transfer rate, i.e., the highest output radio frequency (RF) from the pickup head; when located at the innermost radial position, it causes the lowest data transfer, i.e., the lowest RF from the pickup head. The inconsistency in the RF can be solved by providing an increase in the data phase-locked loop (PLL) bandwidth.

FIG. 3 is a schematic block diagram of a CLV control circuit for controlling the spindle motor 11 of an optical disc drive. The spindle motor 11 operates in the CLV mode so as to rotate an optical disc 10 during the read operation. In this control circuit, the feedback signal is not obtained from a speed encoder, as it is in most conventional control circuits, but instead is extracted from the EFM signal obtained from the optical disc 10. As mentioned earlier, the purpose of the CLV mode is to maintain the data transfer rate at a fixed value. To achieve this, the fundamental frequency data Pck4m extracted from the EFM signal is compared with a reference signal Vck4m, and the resulting error signal is used in the feedback control for the speed of the spindle motor 11. As mentioned earlier, the amount of data stored at a particular radial position is proportional to the distance between that radial position and the center of the optical disc. Therefore, in order to maintain the data transfer rate at a fixed value, the motor speed is increased when the pickup head is moved radially outwards, and decreased when the pickup head is moved radially inwards. This relationship is shown in FIGS. 1A–1B.

FIG. 4 is a schematic block diagram of a CAV control circuit for controlling the spindle motor 21 of an optical disc drive, so that the spindle motor 21 operates in the CAV mode. In this control circuit, the feedback signal indicative of the current speed of the spindle motor 21 is obtained from the output signal FG of a Hall device 20 which is coupled to the spindle motor 21. As mentioned earlier, the purpose of the CAV mode is to maintain the angular speed of the spindle motor 21 at a fixed value. To achieve this, the FG signal from the Hall device 20 is compared with a reference signal Vck4m to thereby obtain an error signal that is used in the feedback control for the speed of the spindle motor 21. As mentioned earlier, the amount of data stored at a particular radial position is proportional to the distance between that radial position and the center of the optical disc. Therefore, with the motor speed being fixed at a constant value, the data transfer rate will be increased when the pickup head is moved radially outwards, and decreased when the pickup head is moved radially inwards. This relationship is shown in FIGS. 2A–2B.

As a summary, the foregoing two conventional motor control methods have the following disadvantages.

(1) First, in the CLV mode of operation, the inconsistency in the speed of the spindle motor when the pickup head is moved to different radial positions causes the seek time to be lengthy and the power consumption of the spindle motor to be high. Moreover, the data transfer rate will be limited to a low rate.

(2) Second, although partitioned read operations in the CLV mode can increase the data transfer rate, the drawbacks of a lengthy seek time and high power consumption are still unsatisfactory when using this scheme.

(3) Third, in the CAV mode of operation, although the spindle motor is low in power consumption and quick in seek time due to the motor speed being always fixed at a constant value, it nonetheless has an undesirably low average data transfer rate since the data transfer rate is very low when the pickup head is reading data from the innermost radial position of the optical disc.

SUMMARY OF THE INVENTION

It is therefore an objective of the present invention to provide a method for controlling the speed of the spindle motor of an optical disc drive, which allows the spindle motor to be adaptively switchable between the CLV mode and the CAV mode so as to allow the benefits of a high data transfer rate, a short seek time, and low power consumption to the optical disc drive.

It is another objective of the present invention to provide a method for controlling the speed of the spindle motor of an optical disc drive, which represents a solution to the above-mentioned problems of the optical disc drive when operating in the CLV mode.

It is still another objective of the present invention to provide a method for controlling the speed of the spindle motor of an optical disc drive, which represents a solution to the above-mentioned problems of the optical disc drive when operating in the CAV mode.

In accordance with the foregoing and other objectives of the present invention, a method for controlling the speed of the spindle motor of an optical disc drive is provided, which allows the spindle motor to be adaptively switchable between the CLV mode and the CAV mode.

The method of the invention is provided for use on an optical disc drive. The method can automatically detect the current position of the pickup head of the optical disc drive and, based on this information, switch the read operation between the CLV mode and the CAV mode for optimal performance of the optical disc drive. The current radial position of the pickup head is detected by using CLV and CAV position estimating means. If the current radial position of the pickup head is at a preset switching point, the mode of operation is switched from the current one to the other. Moreover, the reference signals used in the respective modes are adaptively varied so as to allow the data transfer rate of the data read operation on the optical disc to be consistent in both modes without interrupting the reading and transferring of the data from the optical disc. The method thus provides the benefits of high data transfer rate, short seek time and low power consumption to the optical disc drive.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

To solve the above-mentioned problems of the conventional motor control methods, the invention provides a new motor control method for the spindle motor of an optical disc drive, allowing it to operate either in the CLV mode or in the CAV mode depending on the current radial position of the pickup head for the purpose of providing the benefits of high data transfer rate, short seek time, and low power consumption by the optical disc drive.

Figure 5A:
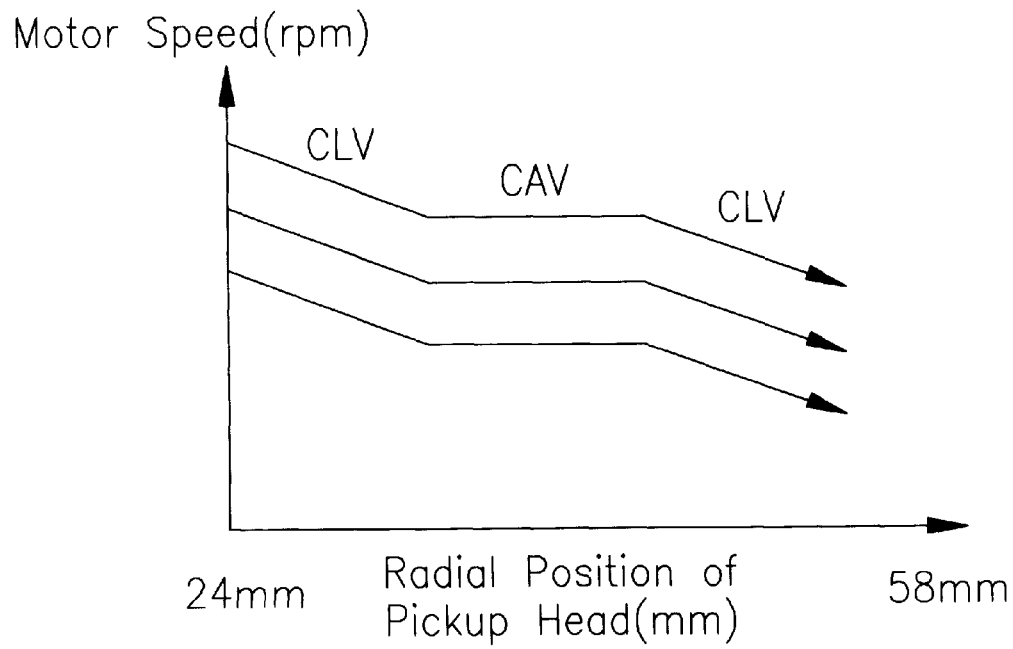
FIG. 5A is a graph, showing the relationship between the speed of the spindle motor and the radial position of the pickup head when the spindle motor is switched between the CLV and the CAV modes, according to the method of the invention.
Figure 5B:
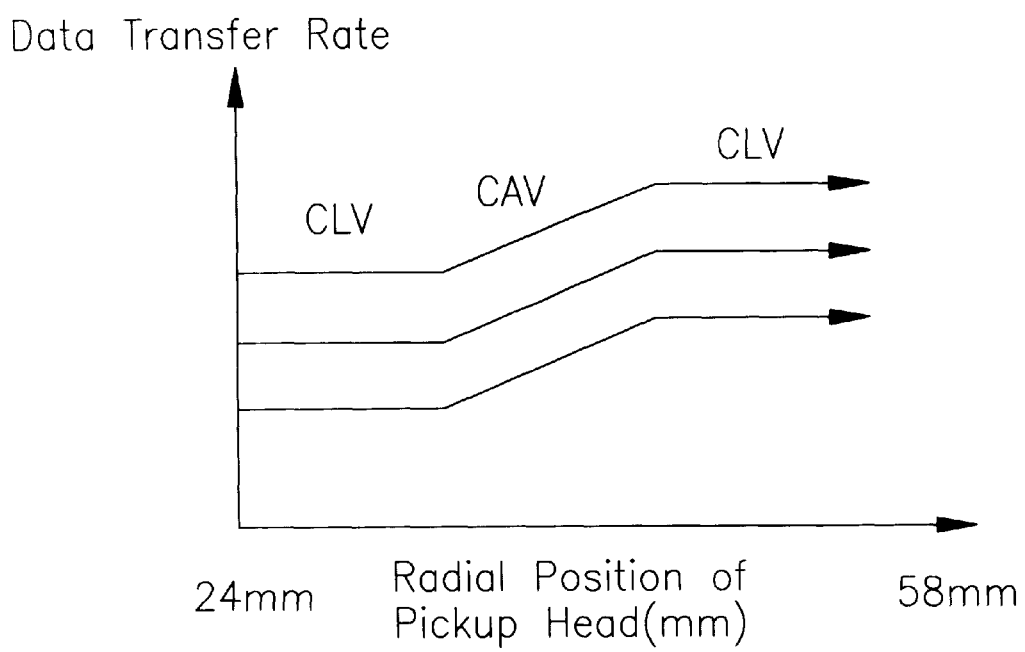
FIG. 5B is a graph showing the relationship between the data transfer rate from the optical disc and the radial position of the pickup head when the spindle motor is controlled by the method of the invention so that it switches between the CLV mode and the CAV mode.

In accordance with the invention, the switching between the CLV mode and the CAV mode is based on the current radial position of the pickup head on the optical disc. During the switching process, the read operation of the data from the optical disc is uninterrupted. FIGS. 5A–5B respectively show the relationship between the speed of the spindle motor and the radial position of the pickup head and the relationship between the data transfer rate from the optical disc and the radial position of the pickup head when the spindle motor is controlled by the method of the invention. In the case of FIG. 5A–5B, for example, two radial positions are selected as the switching points. When the pickup head is moved radially outwards to the first switching point, the motor operation mode is switched from the CLV mode to the CAV mode, and when the pickup head is moved onwards to the second switching point, the motor operation mode is switched from the CAV mode to the CLV mode.

In accordance with the invention, suitable radial positions are selected as the switching points that divide the disc area into several blocks. The spindle motor is set to operate in one mode when the pickup head is located in one block and set to operate in the other mode when the pickup head is located in a different block. The current radial position of the pickup head is detected by using position estimators. In the CLV mode, the position estimator is referred to as a CLV position estimator; in the CAV mode, the position estimator is referred to as a CAV position estimator. Details of the method of the invention will be fully disclosed in the following.

Figure 1A:
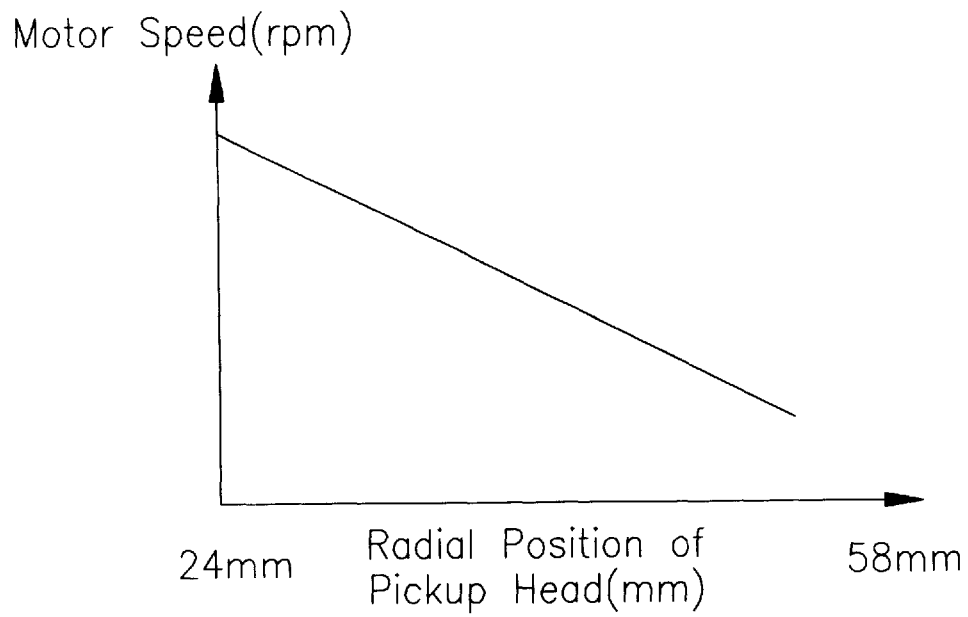
FIG. 1A is a graph, showing the relationship between motor speed and radial position of the pickup head when the optical disc drive is operating in the CLV mode.
Figure 1B:
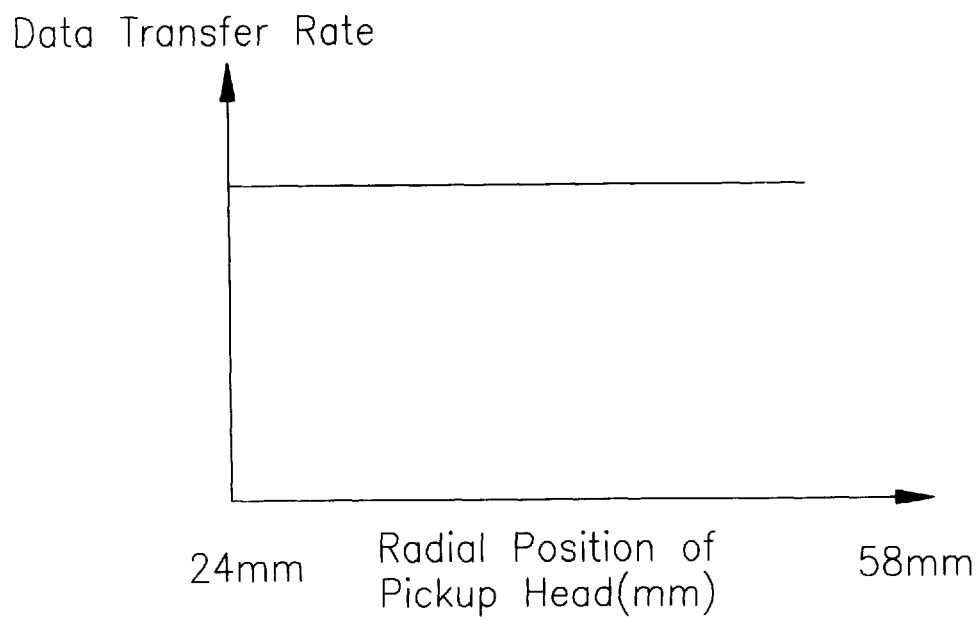
FIG. 1B is a graph, showing the relationship between data transfer rate and radial position of the pickup head when the optical disc drive is operating in the CLV mode.
Figure 2A:
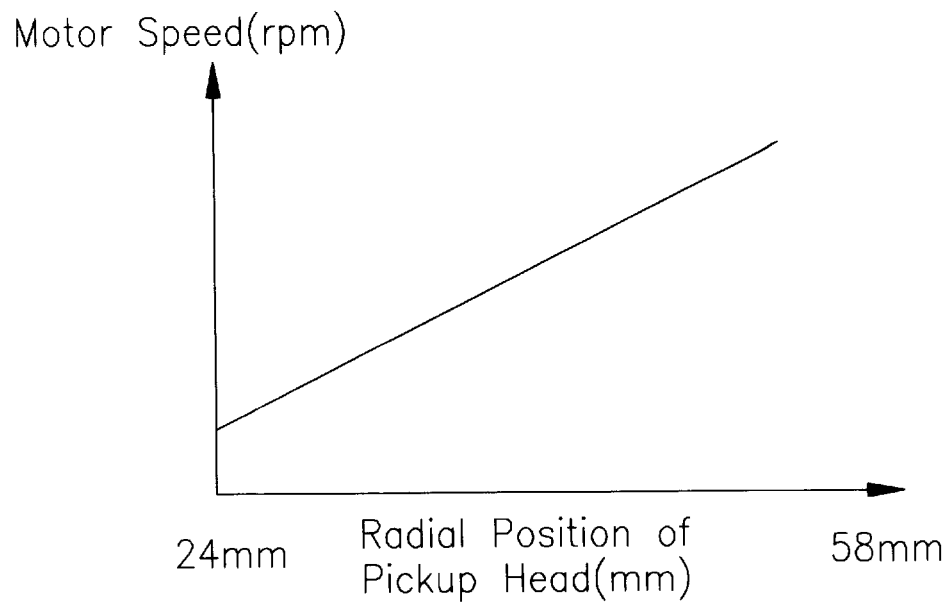
FIG. 2A is a graph, showing the relationship between data transfer rate and radial position of the pickup head when the optical disc drive is operating in the CAV mode.
Figure 2B:
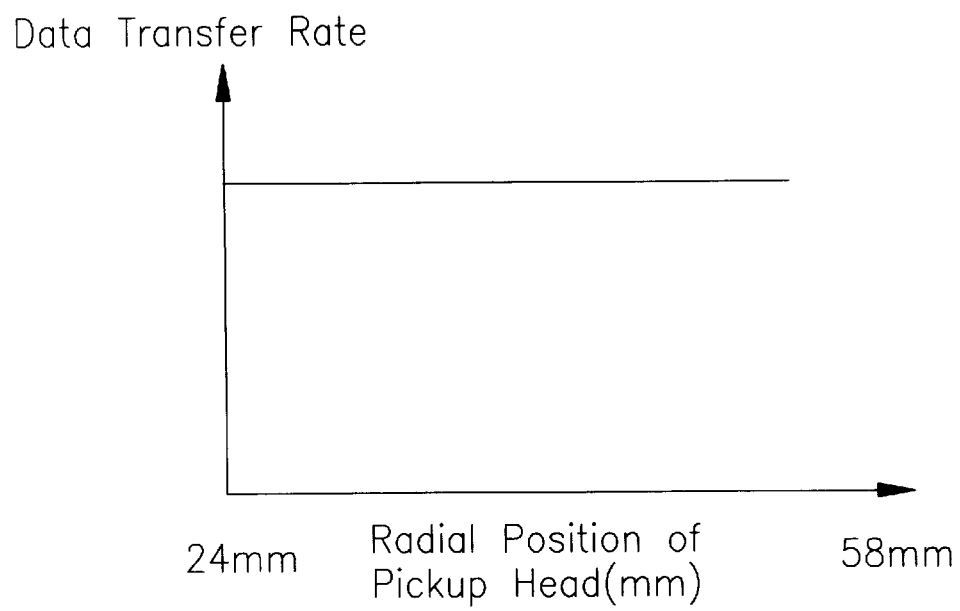
FIG. 2B is a graph, showing the relationship between motor speed and radial position of the pickup head when the optical disc drive is operating in the CAV mode.
Figure 3:
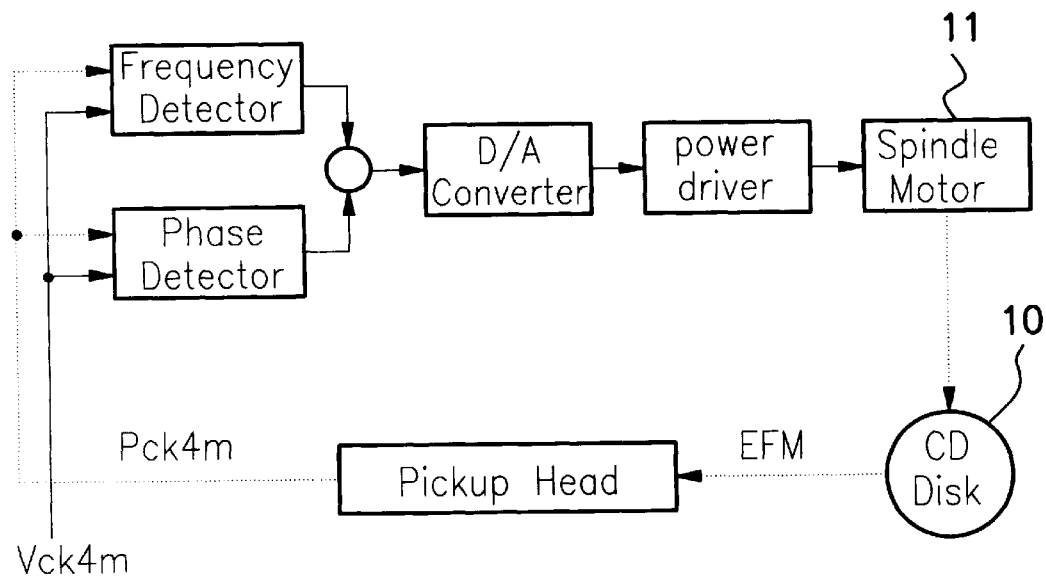
FIG. 3 is a schematic block diagram of a CLV control circuit for controlling the spindle motor of an optical disc drive to operate in the CLV mode.
Figure 4:
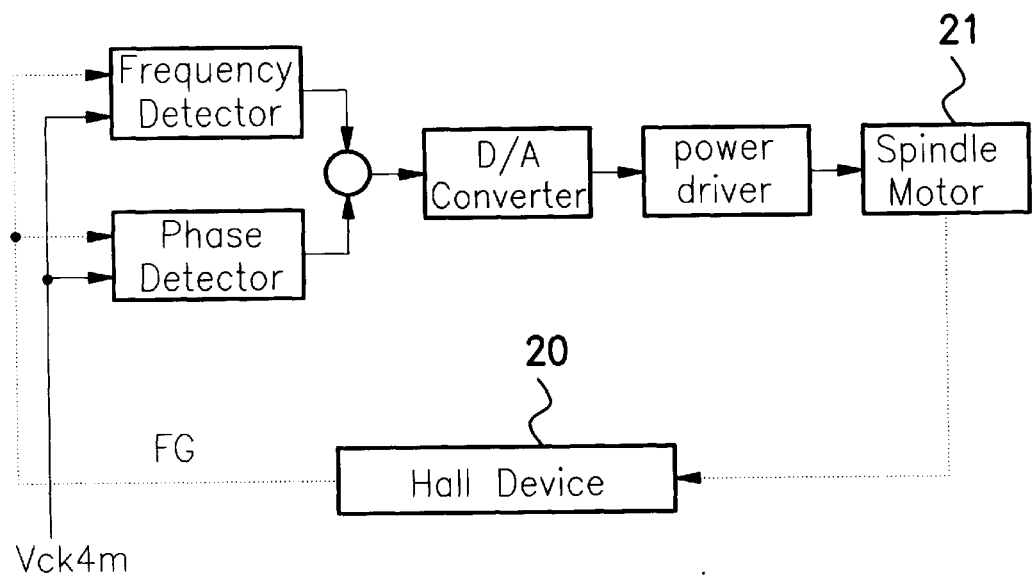
FIG. 4 is a schematic block diagram of a CAV control circuit for controlling the spindle motor of an optical disc drive to operate in the CAV mode.
Figure 6:
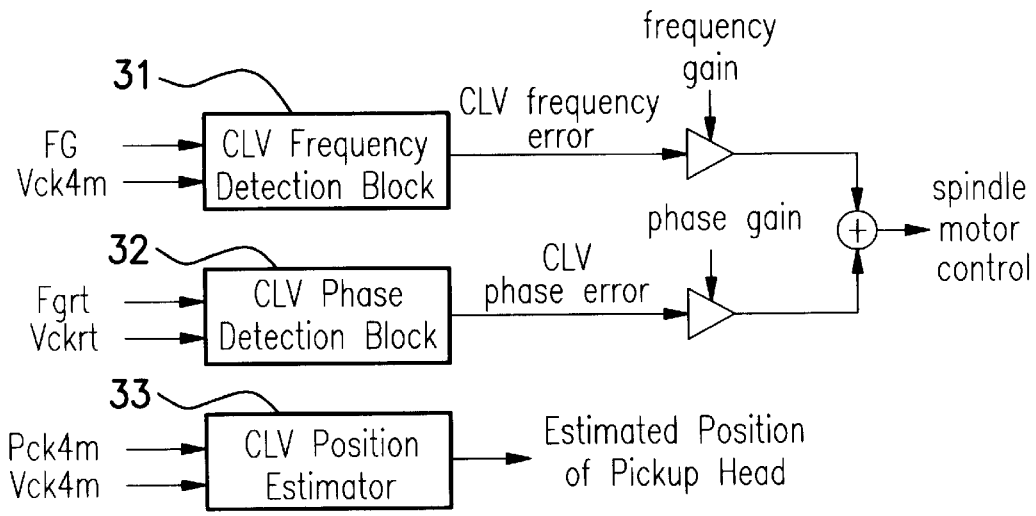
FIG. 6 is a schematic block diagram of a CLV control circuit for controlling the spindle motor of the optical disc drive to operate in the CLV mode when being switched to the CLV mode by the method of the invention.

FIG. 6 is a schematic block diagram of a CLV control circuit that controls the spindle motor of the optical disk drive when it is switched into the CLV mode by the method of the invention. As shown, the CLV control circuit includes a CLV frequency detection block 31, a CLV phase detection block 32, and a CLV position estimator 33. The CLV frequency detection block 31 compares the fundamental frequency data Pck4m with the reference signal Vck4m to thereby obtain a CLV frequency error signal. Meanwhile, the CLV phase detection block 32 compares the data Pck1.8k with the data Vck1.8k (where Pck1.8k is obtained by dividing Pck4m with 588×4, and Vck1.8k is obtained by dividing Vck4m with 576×4) to thereby obtain a CLV phase error signal. The CLV frequency error signal from the CLV frequency detection block 31 and the CLV phase error signal from the CLV phase detection block 32 are then amplified to suitable levels, after which they are combined into a single feedback control signal to control the operation of the spindle motor. Moreover, the CLV position estimator 33 compares the FG signal (from the Hall device 20 coupled to the spindle motor; see FIG. 4) with Vck4m to thereby obtain a position error signal which can be used to indicate the current radial position of the pickup head.

The pulses from the Hall device 20 (FIG. 4) can be different in width. For example, a typical 12-pole Hall device can generate a sequence of 6 pulses for each revolution of the spindle motor, each pulse having a different width from the others. Therefore, the FG signal is averaged (by dividing the total width of the six pulses by six) and then down-converted in frequency (by using a frequency divider means) before it is being compared with Vck4m by the CLV position estimator 33. After being down-converted in frequency, the frequency of the FG signal is in the range of 10 to 1,000 Hz. Since Vck4m is typically several megahertzes in frequency, it is also down-converted in frequency to a level low enough for easy processing. Therefore, FG and Vck4m are down-converted in frequency in accordance with the following equations:

$$f_{Fgrt} = \frac{f_{FG}}{CAVDIVFG} \quad (1)$$

$$f_{Vckrt} = \frac{f_{Vck4m}}{CAVDIVVCK} \quad (2)$$

where
$f_{Fgrt}$ is the down-converted frequency of the FG signal;
$f_{FG}$ is the original frequency of the FG signal;
$f_{Vckrt}$ is the down-converted frequency of Vck4m;
$f_{Vsk4m}$ is the original frequency of Vck4m;
CAVDIVFG is a preset frequency divisor for down-converting FG; and CAVDIVVCK is a preset frequency divisor for down-converting Vck4m.

Figure 7:
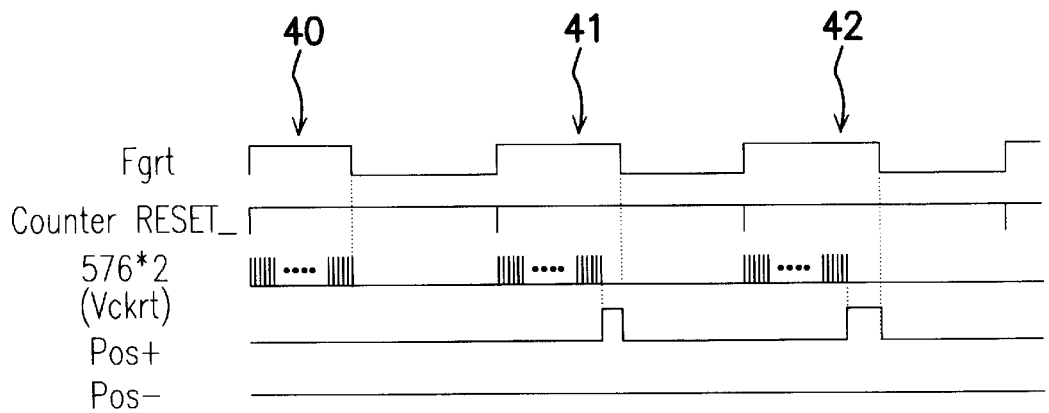
FIG. 7 is a waveform diagram showing the waveforms of various signals involved in the CLV position estimator and used in the CLV control circuit of FIG. 6.

In the CLV position estimator 33, the total time length of 576×2 pulses from Vckrt is compared with one half period of Fgrt to thereby obtain the position error signal Pos+ or Pos−, as illustrated in FIG. 7. Further, at the time when the pickup head is located at the innermost radial position (where r=24 mm), CAVDIVFG and CAVDIVVCK are set to suitable values that allow the frequency ratio of Fgrt to Vckrt to be $f_{Fgrt}: f_{Vckrt}=1:576×4$; i.e., $$f_{Fgrt} = \frac{f_{Vckrt}}{576 \times 4} \quad (3)$$

In FIG. 7, the reference numeral 40 indicates the timings and waveforms of Fgrt, Vckrt, Pos+, and Pos− when the pickup head is located at the innermost radial position of the optical disc, the reference numeral 41 indicates the same when the pickup head is located at an intermediate radial position on the optical disc, and the reference numeral 42 indicates the same when the pickup head is located at the outermost radial position of the optical disc. As shown, at the innermost radial position, the position error signals Pos+ and Pos− are both null. As mentioned earlier, in the CLV mode, the motor speed is inversely proportional to the radial position of the pickup head if the data transfer rate is maintained at a fixed value. Since the frequency of the FG signal decreases linearly as the pickup head is moved radially outwards, the period of the FG signal increases linearly as the pickup head is moved radially outwards. In the CLV position estimator 33, the frequency of Fgrt is obtained from Eq. (1). Therefore, the period of Fgrt increases as the pickup head is moved radially outwards. As shown in FIG. 7, when the pickup head is moved to the intermediate radial position and the outermost radial position, the Fgrt signal will be changed in waveform as those respectively indicated by the reference numerals 41 and 42. Since Vckrt has a fixed frequency $f_{Vckrt}$, the difference between $f_{Fgrt}$ and $f_{Vckrt}$ will be gradually increased; i.e., the period of Pos+ will be gradually increased. At the innermost radial position, CAVDIVVCK is set to a suitable value that allows the total time length of 576×2 pulses from Vckrt to be equal to one half period of Fgrt (i.e., $f_{Fgrt}: f_{Vckrt}=1: 576×4$) so as to allow the position error signal to be 0. This also allows one half period of Fgrt to be equal to the total time length of 1,152 pulses from Vckrt when the pickup head is located at the innermost radial position. Accordingly, each pulse from Vckrt represents a radial displacement of 24/1152=0.0208 mm (equivalently, each radial displacement of 1 mm corresponds to the time length of the appearance of 48 pulses from Vckrt. Therefore, the current radial position of the pickup head can be estimated by counting the number of pulses from Vckrt that appear during the period of the position error signal Pos+.

Also, the current radial position of the pickup head can be estimated by the following equation:

$$\frac{1152}{1152+x} = \frac{24}{r} \quad (4)$$

where
r is the current radial position of the pickup head (in unit of mm); and
x is the number of pulses from Vckrt that appear during the period of Pos+.

Therefore, the CAVDIVVCK value can be determined only when the time length of one half period of Fgrt, when the pickup head is located at the innermost radial position, is known. In the event that the currently set CAVDIVVCK value is unable to allow the position error signal at the innermost radial position to be 0, the relationship of the period of Fgrt being, proportional to the radial position of the pickup head can be put into consideration to offset this condition.

Figure 8:
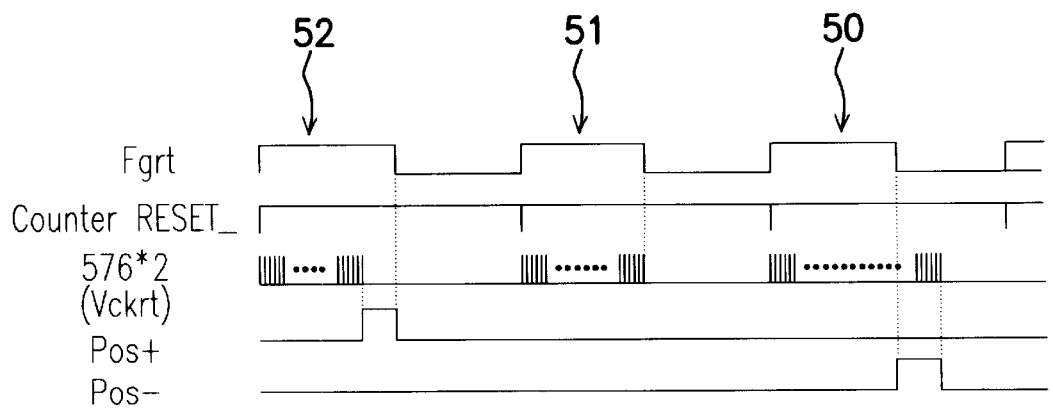
FIG. 8 is a waveform diagram showing the waveforms of various signals involved in the CLV position estimator utilized in the CLV control circuit of FIG. 6.

For example, if the CAVDIVVCK is overly small in value when the pickup head is located at the innermost radial position, it will cause the generation of Pos+ as indicated by the reference numeral 52 in FIG. 8. Assume the period of Pos+ is correspondingly equal to the time length of n pulses from Vckrt, then one half period of Fgrt is correspondingly equal to the time length of (1152+n) pulses from Vckrt and each of the pulses represents a radial displacement of 24/(1152+n) mm of the pickup head. Therefore, the equation for determining the current radial position r of the pickup head is modified as follows:

$$\frac{1152+n}{1152+x} = \frac{24}{r} \qquad (5)$$

where x is the total number of pulses from Vckrt that appear during the period of Pos+.

On the other hand, if CAVDIVVCK value is overly large in value when the pickup head is located at the innermost radial position, it will cause the generation of Pos− as indicated by the reference numeral 50 in FIG. 8. Assume the period of Pos− is correspondingly equal to the time length of n pulses from Vckrt; then one half period of Fgrt is correspondingly equal to the time length of (1152−n) pulses from Vckrt and each of the pulses represents a radial displacement of 24/(1152−n) mm of the pickup head. Therefore, the current radial position r of the pickup head can be obtained from the following equation:

$$\frac{1152-n}{1152+x} = \frac{24}{r} \qquad (6)$$

In Eqs. (5) and (6), the variable x represents the total number of pulses from Vckrt that appear during the period of Pos+ or Pos−. In the case of the generation of Pos+, x is a positive number; in the case of the generation of Pos−, x is a negative number. If CAVDIVVCK is set at the exact value, Pos+ or Pos− will be zero, as indicated by the reference numeral 51 in FIG. 8.

In practice, the line speed (commonly denoted by β) of the data write operation on an optical disc can affect the time length of one half period of Fgrt due to the fact that the data density on an optical disc is inversely proportional to β. A smaller line speed β means a larger data density on the optical disk. When reading two optical discs of different data densities, it is required to operate the spindle motor at a lower speed when reading the low-density optical disc and a higher speed when reading the high-density one so as to maintain the same data transfer rate for both of the two different types of optical discs. Therefore, the speed of the spindle motor is proportional to β, and the period of Fgrt is inversely proportional to β. Typically, the value of β is in the range from 1.2 m/s to 1.4 m/s (meter per second). For example, β is about 1.2 m/s for CD-Rs (compact disc recordable), and about in the range of from 1.2 m/s to 1.4 m/s for factory-manufactured Cds (compact disc). Assume β=1.3 m/s is used; then the error in the position estimation for optical discs with β values ranging from 1.2 m/s to 1.4 m/s will be 0.1/1.3=7.7%. In design, if the exact β value of the optical disc can be obtained, it can be taken into consideration so more precise position estimation can be obtained.

It can be learned from the foregoing description that the frequency of the FG signal is inversely proportional to the current radial position r of the pickup head and is proportional to the line speed β of the data write operation on the optical disc; i.e., $$f_{FG} \propto \frac{\beta}{\gamma} \text{ or } T_{FG} \propto \frac{\gamma}{\beta} \qquad (7)$$

where $f_{FG}$ is the frequency of the FG signal; and $T_{FG}$ is the period of the FG signal, $T_{FG}=1/f_{FG}$.

Taking the line speed β into the consideration, the equation for determining the radial position r of the pickup head can be modified as follows:

$$\frac{1152+n}{1152+x} = \frac{24}{r} \times \frac{\beta}{\beta^*} \qquad (8)$$

where n is the position error signal when the pickup head is located at the innermost radial position when CAVDIVFG and CAVDIVVCK are set based on the value of β*; in the case of the generation of Pos+, n is a positive value, and in the case of the generation of Pos−, n is a negative value;

x is the number of the pulses from Vckrt that appear during the period of Pos+ or Pos−; x is a positive value in the base of the generation of Pos+, and a negative value in the case of the generation of Pos−;

β is the line speed of the data write operation on the optical disc; and

β* is the reference line speed of the parameter setting on position estimator. Rearranging Eq. (8), the following equation can be obtained:

$$r = \frac{1152+x}{1152+n} \times 24 \times \frac{\beta}{\beta^*} \qquad (9)$$

This equation shows that, when taking the line speed β into consideration, the resulted radial position r is corrected by a factor of β/β*.

In this CLV mode, it can also be deduced that the radial position r of the pickup head is independent of the speed of the optical disc drive. When the speed of the optical disc drive is doubled, the frequency of Vck4m is also doubled, causing the speed of the spindle motor and thus the frequency of the FG signal to be correspondingly doubled. As a result, the ratio between these values is still the same. Therefore, Eq. (9) is valid for all speeds of the optical disc drive.

Figure 9:
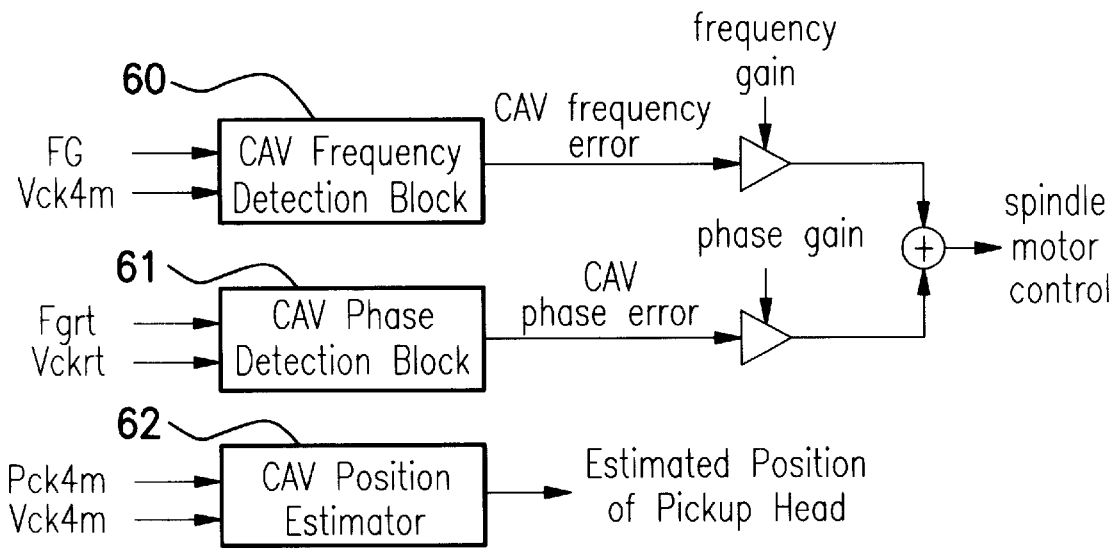
FIG. 9 is a schematic block diagram of a CAV control circuit for operating the spindle motor of the optical disc drive in the CAV mode when the spindle motor is being switched to the CAV mode by the method of the invention.

FIG. 9 is a schematic block diagram of a CAV control circuit for controlling the spindle motor of the optical disc drive so that it operates in the CAV mode when being switched to the CAV mode by the method of the invention. As shown, the CAV control circuit includes a CAV frequency detection block 60, a CAV phase detection block 61, and a CAV position estimator 62. The CAV frequency detection block 60 compares the FG signal with Vck4m to thereby generate a CAV frequency error signal; meanwhile, the CAV phase detection block 61 compares the Fgrt signal with the Vckrt signal to thereby generate a CAV phase error signal. The CAV frequency error signal from the CAV frequency detection block 60 and the CAV phase error signal from the CAV phase detection block 61 are then amplified to suitable levels. After which they are combined into a single feedback control signal to control the operation of the spindle motor. Moreover, the CAV position estimator 62 compares the fundamental frequency data Pck4m with the reference signal Vck4m to thereby obtain a position error signal which can be used to indicate the current radial position of the pickup head.

In the CAV position estimator 62, the comparison of Pck4m with Vck4m is carried out in such a manner that the total time length of 576×2 pulses from Vck4m is compared with one half period of Pck1.8k, where Pck1.8k is obtained from the frequency division of Pck4m by 588×4, to thereby obtain the position error signal Pos+ or Pos−. The data Pck4m is extracted from the data signal from the optical disc. In the CAV mode, it is desired to allow the frequency of Pck4m and the frequency of Vck4m to comply with the following relationship:

$$f_{Pck4m} : f_{Vck4m} = 588 : 576 \tag{10}$$

First, the line speed β is not taken into consideration. In the CAV mode, it is also desirable to set CAVDIVFG and CAVDIVVCK to suitable values that can allow $f_{Ffrt}$, $f_{Pck4m}$, and $f_{Vck4m}$ to satisfy Eqs. (3) and (10) when the pickup head is located at the innermost radial position. The CAVDIVFG and CAVDIVVCK values are the same as those obtained in the CLV mode, so that when switched to the CAV mode, no additional computation for obtaining the CAVDIVFG and CAVDIVVCK values is required. The same CAVDIVFG and CAVDIVVCK values are used in both the CLV mode and the CAV mode.

Figure 10:
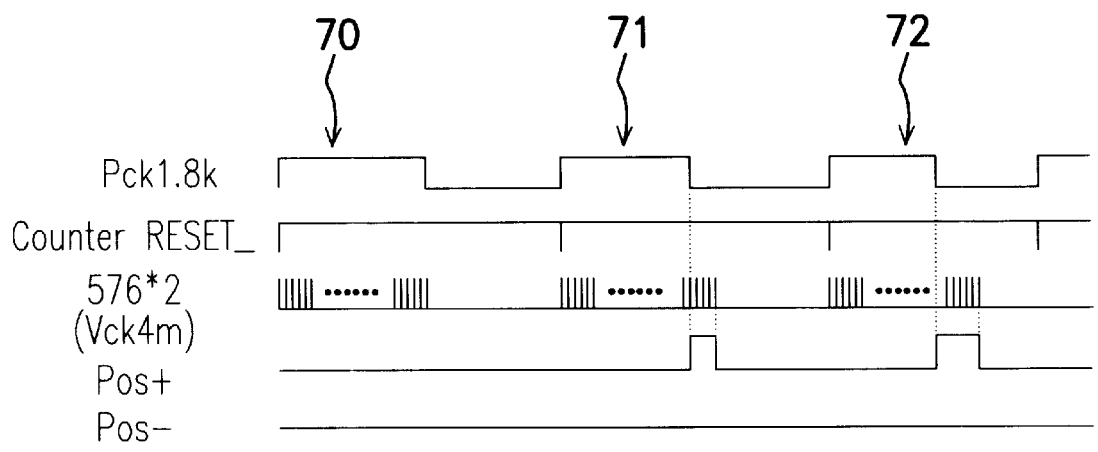
FIG. 10 is a waveform diagram showing the waveforms of various signals involved in the CAV position estimator utilized in the CAV control circuit of FIG. 9.

FIG. 10 is a waveform diagram used to depict the waveforms and timings of the signals Pck1.8k, Vck4m, Pos+, and Pos− that are involved in the CAV position estimator 62. In FIG. 10, the reference numeral 70 indicates the timings and waveforms of these signals when the pickup head is located at the innermost radial position of the optical disc, the reference numeral 71 indicates the same when the pickup head is located at an intermediate radial position on the optical disc, and the reference numeral 72 indicates the same when the pickup head is located at the outermost radial position of the optical disc. As shown, when the pickup head is located at the innermost radial position (associated waveforms are indicated by the reference numeral 70), the total time length of the pulses from Vck4m is exactly equal to one half period of the Pck1.8k, thus causing Pos+ and Pos− to be zero. As mentioned earlier, in the CAV mode the speed of the spindle motor is maintained at a fixed value. Therefore, the data transfer rate is proportional to the radial position of the pickup head. As a result, the fundamental frequency data Pck4m extracted from the data signal from the optical disc is proportional to the current radial position of the pickup head. When the pickup head is moved to the intermediate radial position, the waveforms of these signals Pck1.8k, Vck4m, Pos+, and Pos− are indicated by the reference numeral 71 in FIG. 10. When the pickup head is moved to the outermost radial position, the waveforms of the same are indicated by the reference numeral 72. As the pickup head is moved radially outwards, the period of Pck1.8k will be decreased. However, since Vck4m is fixed in time length, the difference between the total time length of Pck4m and the period of Vck4m will be increased as the pickup head is moved radially outwards, thereby causing an increase in the period of Pos+. At the innermost radial position, CAVDIVFG and CAVDIVVCK are set to such values that allow one half period of Pck1.8k to be exactly equal to the total time length of 1152 pulses from Vck4m. Since the period of Pck1.8k is inversely proportional to the current radial position of the pickup head, the following relationship can be obtained:

$$\frac{1152}{1152 - x} = \frac{r}{24} \tag{11}$$

where x is the number of pulses in Vck4m that appear during the period of Pos+. From Eq. (11), the current radial position r of the pickup head can be obtained. In the event that the CAVDIVVCK value is unable to allow the frequency difference between Pck1.8k and Vck4m to be 0 when the pickup head is located at the innermost radial position, the relationship of the period of Pck4m being inversely proportional to the radial position of the pickup head can be taken into consideration.

Figure 11:
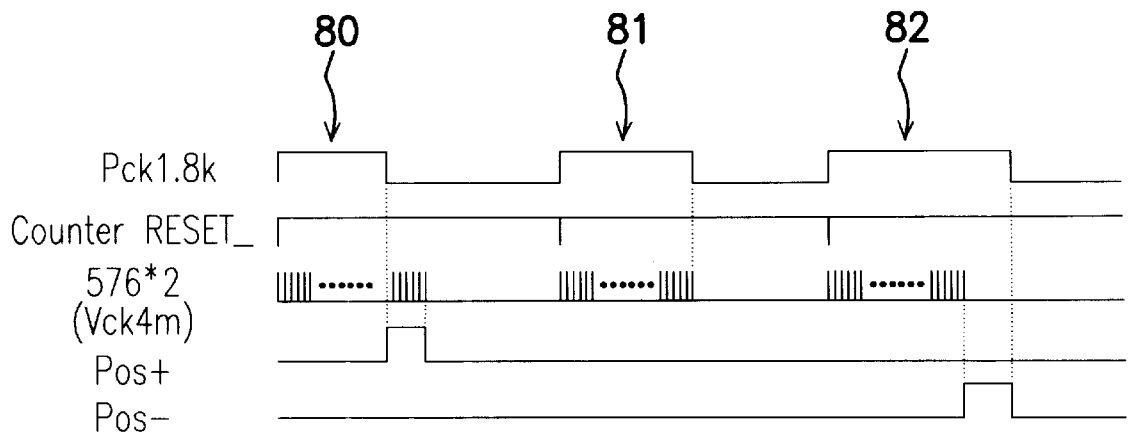
FIG. 11 is a waveform diagram showing the waveforms of various signals involved in the CAV position estimator utilized in the CAV control circuit of FIG. 9.

For example, in the event that the CAVDIVVCK value is overly small for the innermost radial position, it will cause the period of Vckrt to become small, the period of Fgrt to become small, the data transfer rate to become large, and the frequency of Pck4m to become large, thus resulting in the generation of Pos+ in the form of a pulse (see the waveforms indicated by the reference numeral 80 in FIG. 11). Assume the period of the Pos+ pulse is equal to a number of n pulses in Vck4m that appear during this period, then one half period of Pck1.8k is equal to the total time length of (1152−n) pulses from Vck4m. Therefore, Eq. (11) can be modified as follows:

$$f_{Vck4m2} = \frac{f_{Vck4m1} \times C_2}{r \times C_1} \tag{12}$$

where x is the number of pulses in Vck4m that appear during the period of Pos+.

On the other hand, in the event that the CAVDIVVCK value is overly large, it will cause the generation of Pos− in the form of a pulse (see the waveforms indicated by the reference numeral 82 in FIG. 11). Assume the period of the Pos− pulse is equal to a number of n pulses in Vck4m that appear during this period. The following relationship can be obtained:

$$\frac{1152 + n}{1152 - x} = \frac{r}{24} \tag{13}$$

where x is the number of pulses in Vck4m that appear during the period of Pos−.

In the foregoing two cases, if Pos+ is generated, x is a positive value, whereas if Pos− is generated, x is a negative value. In FIG. 11, the reference numeral 81 indicates the waveforms of Pck1.8k, Vck4m, Pos+, and Pos− when CAVDIVVCK is set at the exact value. As shown, in this case, both the Pos+ and Pos− are null.

In the following, the line speed β of the data write operation on the optical disc will be taken into consideration. Since the data density on the optical disc is inversely proportional to β, it can be concluded that, when the motor speed is fixed, the smaller the value of β, the larger the data transfer rate becomes. Therefore, the frequency of Pck4m is inversely proportional to β; i.e., the period of Pck1.8k is proportional to β. Assuming β=1.3 m/s is used, the error in the position estimation for optical discs with β values ranging from 1.2 m/s to 1.4 m/s will be 0.1/1.3=7.7%. In design, if the exact β value of the optical disc can be obtained, it can be taken into consideration so as to obtain more precise position estimation.

It can be learned from the foregoing description that the frequency of Pck1.8k (Pck4m) is proportional to the current radial position r of the pickup head and is inversely proportional to the line speed β of the data write operation on the optical disc; i.e., $$f_{Pck4m} \propto \frac{\gamma}{\beta} \text{ or } T_{Pck4m} \propto \frac{\beta}{\gamma} \qquad (14)$$

where $f_{Pck4m}$ is the frequency of Pck4m; and $T_{Pck4m}$ is the period of Pck4m, where $T_{Pck4m}=1/f_{Pck4m}$.

Taking the line speed β into the consideration, the equation for determining the radial position r of the pickup head can be modified as follows:

$$\frac{1152-n}{1152-x} = \frac{r}{24} \times \frac{\beta^*}{\beta} \qquad (15)$$

where n is the position error signal when the pickup head is located at the innermost radial position when CAVDIVFG and CAVDIVVCK are set based on the value of β*, in which the generation of Pos+ means n is a positive value, and the generation of Pos− means n is a negative value;

x is the number of the pulses from Vckrt that appear within the period of Pos+ or Pos−; x is a positive value when counting for Pos+ and a negative value when counting for Pos−;

β is the line speed of the data write operation for the optical disc; and

β* is the reference line speed of the parameter setting on position estimator. Rearranging Eq. (8), the following equation can be obtained:

$$r = \frac{1152-n}{1152-x} \times 24 \times \frac{\beta}{\beta^*} \qquad (16)$$

This equation shows that, when taking the line speed β into consideration, the resulting radial position r is corrected by a factor of β/β*.

In the CAV mode, it can also be deduced that the radial position r of the pickup head is independent of the speed of the optical disc drive. When the speed of the optical disc drive is doubled, the frequency of Vck4m is also doubled, causing the speed of the spindle motor and thus the frequency of the associated signals to be correspondingly doubled. As a result, the ratio between these values is still the same. Therefore, Eq. (16) is valid for all speeds of the optical disc drive.

Figure 12:
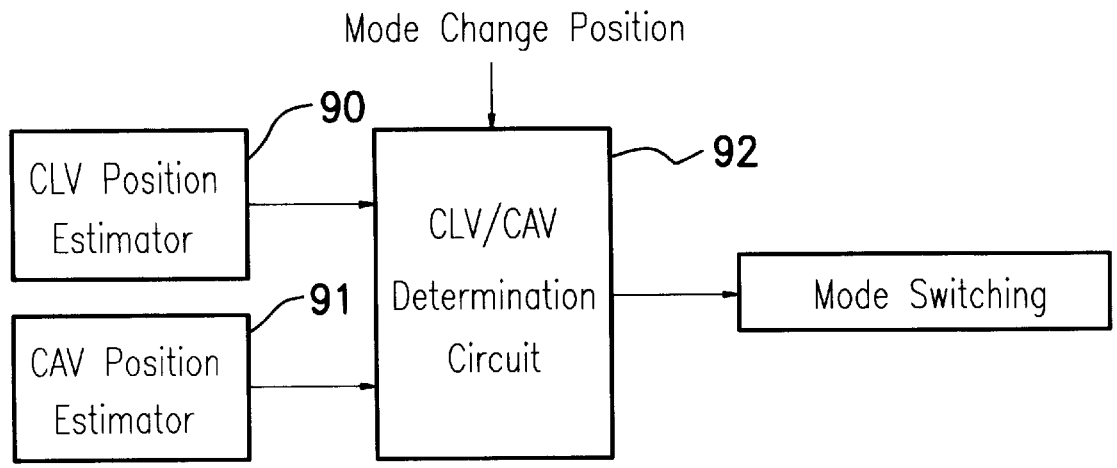
FIG. 12 is a schematic block diagram showing the CLV/CAV switching circuit for implementing the switching between the CLV mode and the CAV mode in accordance with the invention.

FIG. 12 is a schematic block diagram showing the CLV/CAV switching circuit for implementing the switching between the CLV mode and the CAV mode. In accordance with the invention, a specific radial position on the optical disc is selected as the switching point. If the pickup head is detected as crossing the switching point, the mode of operation is switched from the current one to the other; i.e., from the CLV mode to the CAV mode, or from the CAV mode to the CLV mode. As shown, the CLV/CAV switching circuit includes a CLV position estimator 90, a CAV position estimator 91, and a CLV/CAV mode determination circuit 92. The CLV/CAV mode determination circuit 92 takes the preselected switching point as an input setting and compares it with the current radial position of the pickup head as detected by the CLV position estimator 90 or the CAV position estimator 91. If the pickup head is currently located in the CLV region, the CLV/CAV mode determination circuit 92 will switch the control circuit for the spindle motor to operate in the CLV mode, whereas if the pickup head is currently located in the CAV region, the CLV/CAV mode determination circuit 92 will switch the control circuit for the spindle motor to operate. Moreover, the reference frequency is also varied when switching from one to the other so as to allow the data transfer rate to be the same in both modes and also allow an uninterrupted reading and transferring of data from the optical disc. Since any radial position on the optical disc can be estimated by the CLV position estimator 90 (in the CLV mode) and the CAV position estimator 91 (in the CAV mode), the switching point can be set at any radial position on the optical disc by the designer while still allowing uninterrupted reading and transferring of the data from the optical disc.

Each time the pickup head crosses the switching point, the mode is switched from the current one to the other, and Vck4m is set to a new value that allows the data transfer rate to be the same as in the other mode so as to stabilize the read operation at the time the switching occurs. Since Vck4m is different in value in the two modes, two registers are used to stored the two different values of Vck4m. Which one of the two values of Vck4m is retrieved for use depends on the current radial position of the pickup head.

Figure 13A:
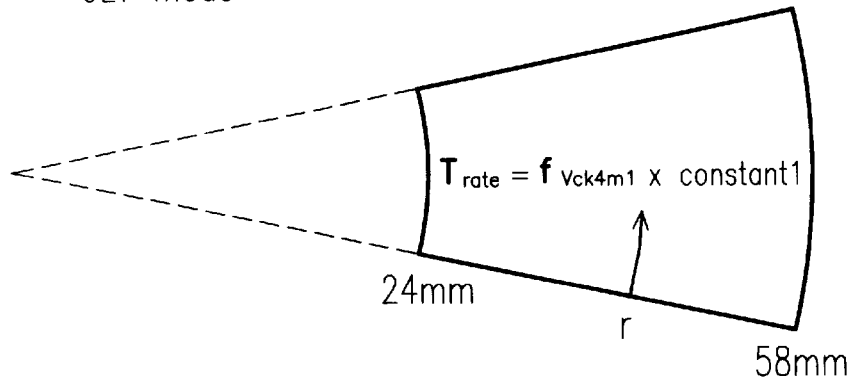
FIGS. 13A–13B are schematic diagrams used to depict the method for determining the values of Vck4m both in the CLV mode and the CAV mode.
Figure 13B:
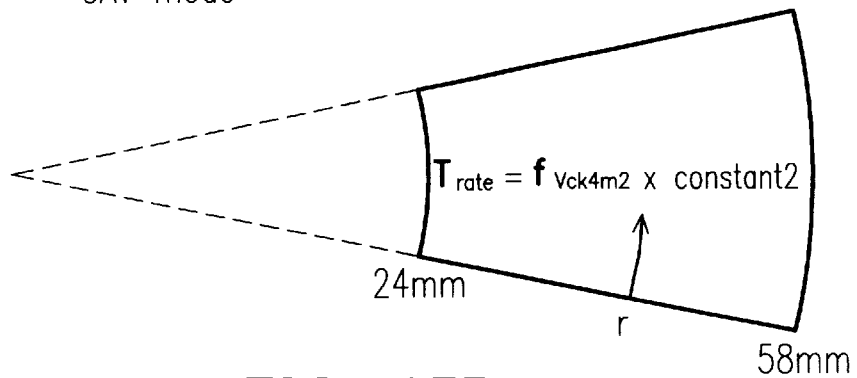

FIGS. 13A–13B are schematic diagrams used to depict the method for determining the values of Vck4m in the CLV mode and the CAV mode, respectively. Assume Vck4m1 is used in the CLV mode and Vck4m2 is used in the CAV mode; then the values of Vck4m1 and Vck4m2 can be determined from the assumption that the data transfer rate $T_{rate(CLV)}$, where $T_{rate(CLV)}=f_{Vck4m1}$ * constant1, in the CLV mode is equal to the data transfer rate $T_{rate(CAV)}$, where $T_{rate(CAV)}=f_{Vck4m2}$ * r * constant2, in the CAV mode; i.e., $$f_{Vck4m1} * constant1 = f_{Vck4m2} * r * constant2 \qquad (17)$$

where constant1 is a first preset constant for the CLV mode; and
constant2 is a second preset constant for the CAV mode.

In conclusion, the invention provides a method for switching the read operation of an optical disc drive between the CLV mode and the CAV mode when the pickup head crosses a preset switching point (a specific radial position) on the optical disc. The invention has the following advantages over the prior art.

(1) First, the invention allows the benefits of higher data transfer rate, shorter seek time, and lower power consumption by the optical disc drive, when compared to the prior art.

(2) Second, the invention allows the data transfer rate of the read operation to be consistent regardless of the current mode.

(3) Third, the invention allows the reading and transferring of the data from the optical disc to be uninterrupted when a switching between the CLV mode and the CAV mode is being made.

(4) Fourth, the invention allows the designer to select any radial position on the optical disc as the switching point without interrupting the reading and transferring of the data from the optical disc.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method for switching the read operation of an optical disc drive between the CLV mode and the CAV mode in response to the current radial position of a pickup head of the optical disc drive, the optical disc drive including a spindle motor for rotating an optical disc during the read operation, said method comprising the steps of:

setting a selected radial position $P_s$ of the pickup head as a switching point, a period $C_T$, a first constant $C_1$, and a second constant $C_2$;

obtaining a first reference signal Vckrt1 of a frequency $f_{Vckrt1}$;

obtaining a signal Fgrt of a frequency $f_{Fgrt}$ which indicates the current speed of the spindle motor;

moving the pickup head to the innermost radial position on the optical disc;

counting the number $T_n$ of pulses in Vckrt1 that appear during one half period of Fgrt, and then obtain a position error signal n, where $n=T_n-C_T$;

obtaining a line speed ratio $F_\beta$;

counting for the number $T_{n1}$ of pulses in Vckrt1 that appear during one half period of Fgrt when the pickup head is located at a first new radial position $P_r$, to thereby obtain a position error signal x, where $x=T_{n1}-C_T$;

obtaining the radial position $P_r$ of the pickup head in accordance with $$Pr = \frac{C_T + x}{C_T + n} \times r \times F_\beta$$

obtaining a second reference signal Vckrt2 of a frequency $f_{Vckrt2}$ when the pickup head is located at the switching point $P_s$, where $$f_{Vckrt2} = \frac{f_{Vckrt1} \times C_2}{r \times C_1};$$

and switching the mode of operation from the CLV mode to the CAV mode, and changing the reference signal for the CAV mode to Vckrt2.

2. The method of claim 1, wherein the current radial position of the pickup head is estimated by a CLV position estimator.

3. The method of claim 1, wherein the signal Vckrt1 and its frequency $f_{Vckrt1}$ are obtained by the steps of:

setting a reference signal Vck4m1 of a frequency $f_{Vck4m1}$;

setting a first frequency divisor CAVDIVVCK; and based on the reference signal Vck4m1, obtaining the signal Vckrt1 of a frequency $f_{Vckrt1}$, where $$f_{Vckrt1} = \frac{f_{Vck4m1}}{CAVDIVVCK}.$$

4. The method of claim 1, wherein the signal Fgrt and its frequency $f_{Fgrt}$ are obtained by the steps of:

obtaining a signal FG which indicates the current speed of the spindle motor of the optical disc drive, the FG signal having a frequency $f_{FG}$;

setting a second frequency divisor CAVDIVFG; and obtaining the Fgrt signal having the frequency of $$f_{Fgrt} = \frac{f_{FG}}{CAVDIVFG},$$

based on the FG signal.

5. The method of claim 1, wherein the period $C_T$ is equal to a variable number.

6. The method of claim 1, wherein the innermost radial position of the pickup head is 24 mm from the rotating center of the optical disc.

7. The method of claim 1, wherein $F_\beta=\beta/\beta^*$, where $\beta$ is the line speed of the data write operation on the optical disc and $\beta^*$ is the reference line speed of the parameter setting on position estimator.

8. A method for switching the read operation of an optical disc drive between the CLV mode and the CAV mode in response to the current radial position of a pickup head of the optical disc drive, the optical disc drive including a spindle motor for rotating an optical disc during the read operation, said method comprising the steps of:

setting a selected radial position $P_s$ of the pickup head as a switching point, a period $C_T$, a first constant $C_1$, and a second constant $C_2$;

obtaining a first reference signal Vck4m1 of a frequency $f_{Vck4m1}$;

obtaining a signal Pck1.8k of a frequency $f_{Pck1.8k}$;

moving the pickup head to the innermost radial position on the optical disc;

counting for the number $T_n$ of pulses in Vck4m1 that appear during one half period of Pck1.8k, and then obtaining a position error signal n, where $n=C_T-T_n$;

obtaining a line speed ratio $F_{62}$;

counting for the number $T_{n1}$ of pulses in Vck4m1 that appear during one half period of Pck1.8k , when the pickup head is located at a first new radial position $P_r$, to thereby obtain a position error signal x, where $x=C_T-T_{n1}$;

obtaining the radial position $P_r$ of the pickup head in accordance with $$Pr = \frac{C_T - n}{C_T - x} \times r \times F_\beta$$

obtaining a second reference signal Vck4m2 of a frequency $f_{Vck4m2}$ when the pickup head is located at the switching point $P_s$, where $$f_{Vck4m2} = \frac{f_{Vck4m1} \times C_2}{r \times C_1};$$

switching the mode of operation from the CAV mode to the CLV mode and changing the reference signal for the CLV mode to Vck4m2.

9. The method of claim 8, wherein the current radial position of the pickup head is estimated by a CAV position estimator.

10. The method of claim 8, wherein the period $C_T$ is equal to a variable number.

11. The method of claim 8, wherein the innermost radial position of the pickup head is 24 mm from the rotating center of the optical disc.

12. The method of claim 8, wherein $F_\beta = \beta/\beta^*$, where $\beta$ is the line speed of the data write operation on the optical disc and $\beta^*$ is the reference line speed of the parameter setting on position estimatorine.

* * * * *

UNITED STATES PATENT AND TRADEMARK OFFICE
CERTIFICATE OF CORRECTION

PATENT NO. : 6,055,219
DATED : 4-25-2000
INVENTOR(S) :
      Ho et al.

It is certified that error appears in the above-identified patent and that said Letters Patent is hereby corrected as shown below:

In column 11, line 34, "$\beta$is the line speed" and insert -- $\beta$ is the line speed -- .

In column 14, line 37, "line speed ratio $F_{62}$" and insert -- line speed ratio $F_\beta$ -- .

Signed and Sealed this

Tenth Day of April, 2001

Attest:

NICHOLAS P. GODICI

Attesting Officer      Acting Director of the United States Patent and Trademark Office